United States Patent
Snaza

(10) Patent No.: US 11,247,638 B1
(45) Date of Patent: Feb. 15, 2022

(54) WINDSHIELD WIPER CLEANING ASSEMBLY

(71) Applicant: Brett Snaza, Long Lake, MN (US)

(72) Inventor: Brett Snaza, Long Lake, MN (US)

( * ) Notice: Subject to any disclaimer, the term of this patent is extended or adjusted under 35 U.S.C. 154(b) by 0 days.

(21) Appl. No.: 16/991,114

(22) Filed: Aug. 12, 2020

(51) Int. Cl.
    *B60S 1/34*     (2006.01)
    *B60S 1/38*     (2006.01)
    *B60S 1/08*     (2006.01)

(52) U.S. Cl.
    CPC .............. *B60S 1/3413* (2013.01); *B60S 1/08* (2013.01); *B60S 1/38* (2013.01); *B60S 2001/3827* (2013.01)

(58) Field of Classification Search
    CPC ...... B60S 1/347; B60S 1/3413; B60S 1/3411; B60S 1/3422; B60S 1/38; B60S 1/08; B60S 2001/3827
    USPC ........................... 15/250.16, 250.19, 250.351
    See application file for complete search history.

(56) References Cited

U.S. PATENT DOCUMENTS

| | | | |
|---|---|---|---|
| 5,469,595 A | 11/1995 | Dara | |
| 5,571,221 A * | 11/1996 | Kuo | B60S 1/0455 15/250.16 |
| 5,749,119 A | 5/1998 | Isaac | |
| 5,867,858 A * | 2/1999 | Kelly | B60S 1/0477 15/250.19 |
| 6,588,046 B1 * | 7/2003 | Lee | B60S 1/0455 15/250.001 |
| 6,721,989 B1 | 4/2004 | Barlow | |
| 9,937,897 B1 * | 4/2018 | Ortiz | B60S 1/08 |
| 2004/0128787 A1 | 7/2004 | Wagner | |
| 2010/0162510 A1 | 7/2010 | Couch | |
| 2017/0204917 A1 * | 7/2017 | Bird | F16D 27/09 |

FOREIGN PATENT DOCUMENTS

| GB | 2477563 | | 8/2011 |
|---|---|---|---|
| JP | 5-162616 | * | 6/1993 |

OTHER PUBLICATIONS

Machine translation of description portion of Japanese publication 5-162616, published Jun. 1993. (Year: 1993).*

* cited by examiner

*Primary Examiner* — Gary K. Graham

(57) ABSTRACT

A windshield wiper cleaning assembly for dislodging debris from a wiper blade includes a housing that is attachable to a windshield wiper arm on a vehicle. A plunger unit is movably integrated into the housing and the plunger unit is urged outwardly from the housing when the plunger unit is turned on. The plunger unit abuts the windshield when the plunger unit is turned on thereby facilitating the arm of the windshield wiper to be urged away from the windshield. Moreover, the plunger is biased to retract into the housing after the plunger unit is turned on thereby facilitating a wiper blade on the windshield wiper arm to strike the windshield. In this way debris can be dislodged from the wiper blade.

12 Claims, 4 Drawing Sheets

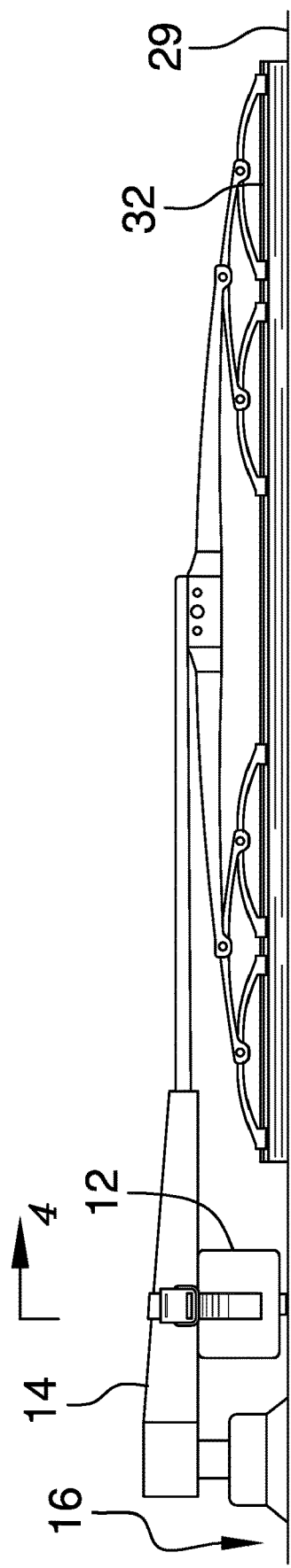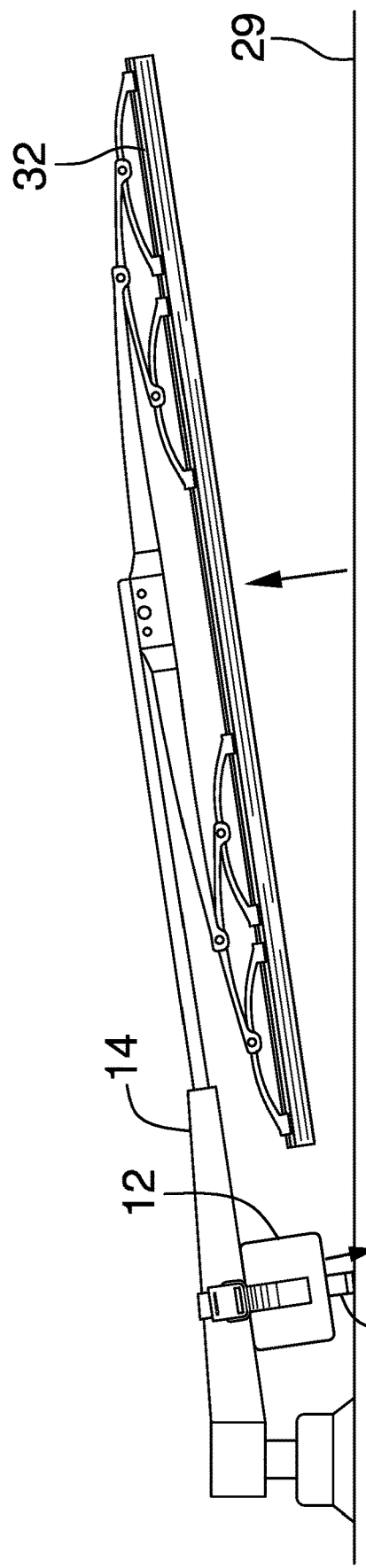

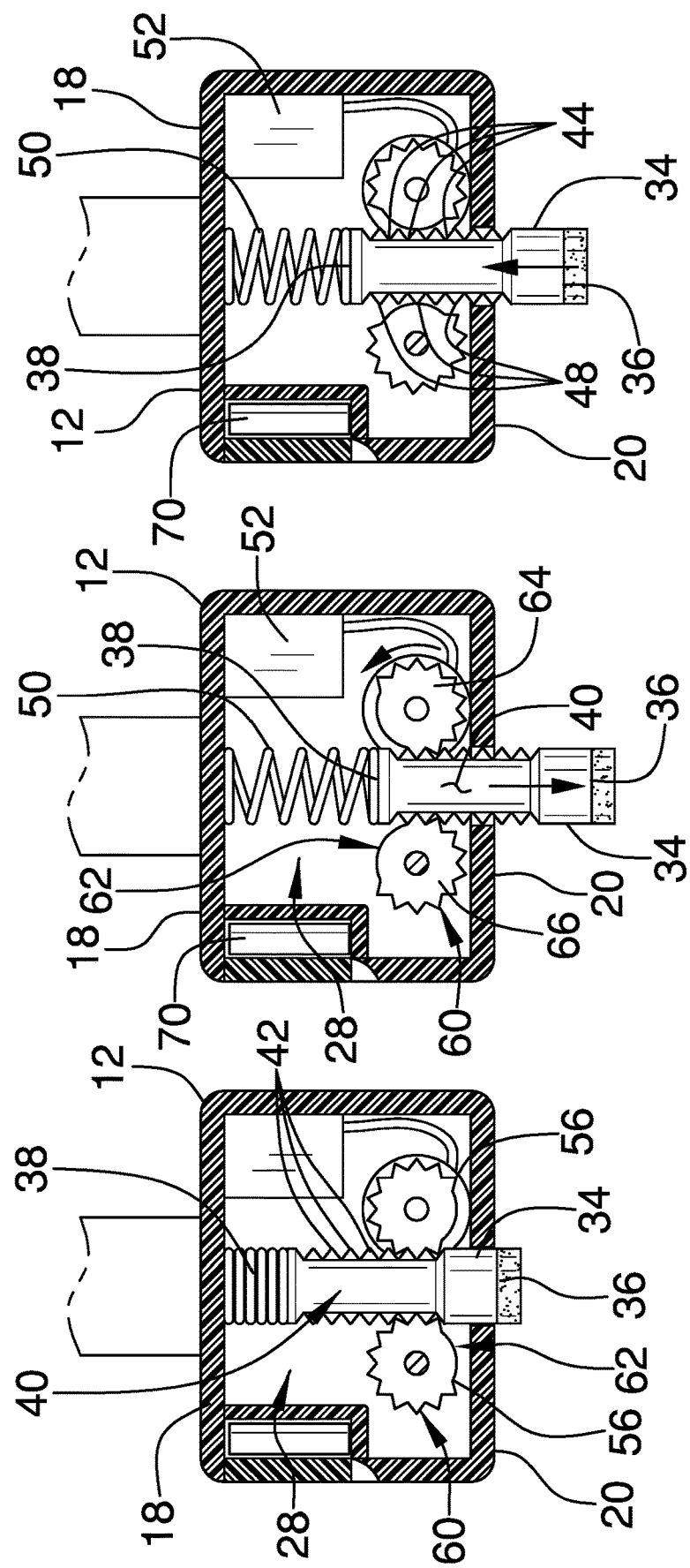

WINDSHIELD WIPER CLEANING ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to wiper cleaning devices and more particularly pertains to a new wiper cleaning device for dislodging debris from a wiper blade of a windshield wiper.

(2) Description of Related Art Including Information Disclosed Under 37 CFR 1.97 and 1.98

The prior art relates to wiper cleaning devices including an actuator that pivots a windshield wiper arm for snapping a wiper blade on a windshield. The prior discloses a deicer device for removing ice from windshield wipers. The prior art discloses a windshield wiper arm that has a snapping mechanism for slapping a wiper blade against a windshield. The prior art discloses a windshield wiper arm that includes a piston actuator for slapping a wiper blade against a windshield.

BRIEF SUMMARY OF THE INVENTION

An embodiment of the disclosure meets the needs presented above by generally comprising a housing that is attachable to a windshield wiper arm on a vehicle. A plunger unit is movably integrated into the housing and the plunger unit is urged outwardly from the housing when the plunger unit is turned on. The plunger unit abuts the windshield when the plunger unit is turned on thereby facilitating the arm of the windshield wiper to be urged away from the windshield. Moreover, the plunger is biased to retract into the housing after the plunger unit is turned on thereby facilitating a wiper blade on the windshield wiper arm to strike the windshield. In this way debris can be dislodged from the wiper blade.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein:

FIG. 2 is a perspective in-use view of an embodiment of the disclosure showing a plunger retracted into a housing.

FIG. 3 is a perspective in-use view of an embodiment of the disclosure showing a plunger being extended out of a housing.

FIG. 6 is a front cutaway view of an embodiment of the disclosure.

FIG. 7 is a front cutaway view of an embodiment of the disclosure showing a plunger being extended out of a housing.

FIG. 8 is a front cutaway view of an embodiment of the disclosure showing a plunger being retracted into a housing.

DETAILED DESCRIPTION OF THE INVENTION

Figure 1:
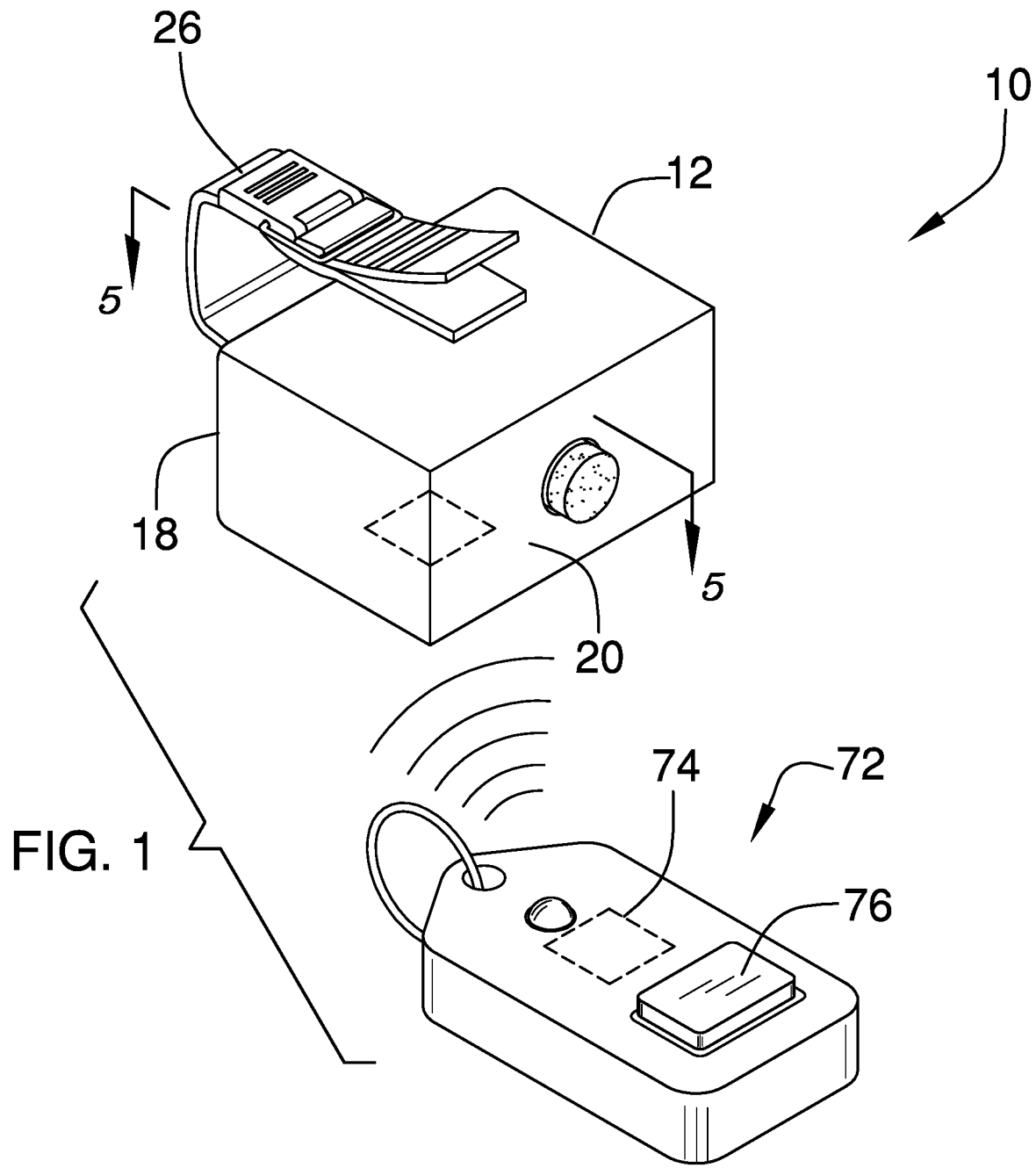
FIG. 1 is a perspective view of a windshield wiper cleaning assembly according to an embodiment of the disclosure.
Figure 4:
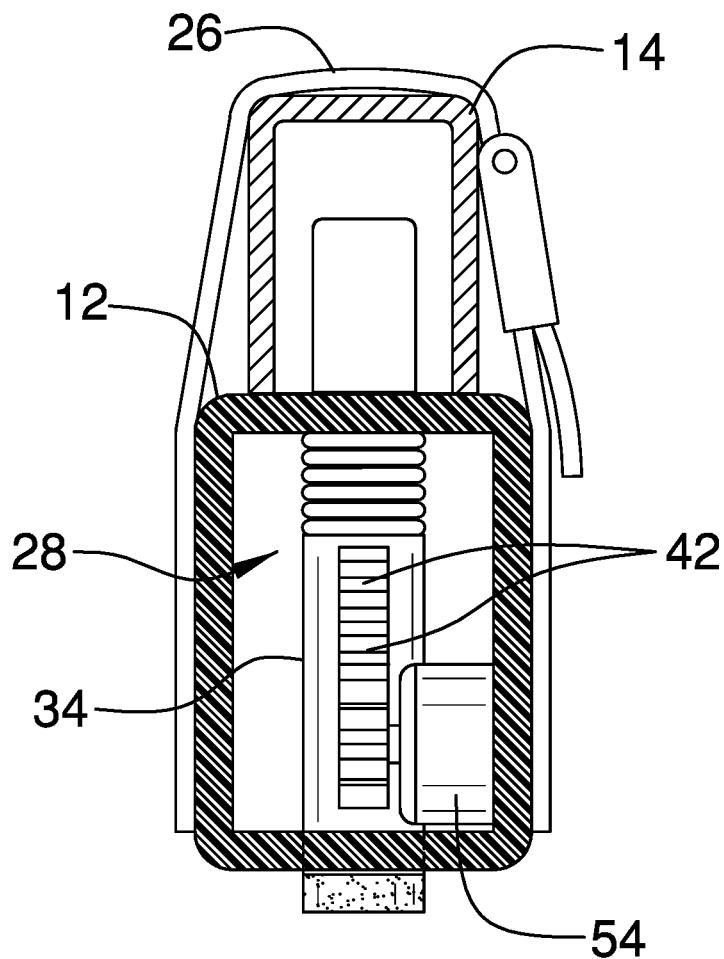
FIG. 4 is a cross sectional view taken along a line 4-4 of FIG. 2 of an embodiment of the disclosure.
Figure 5:
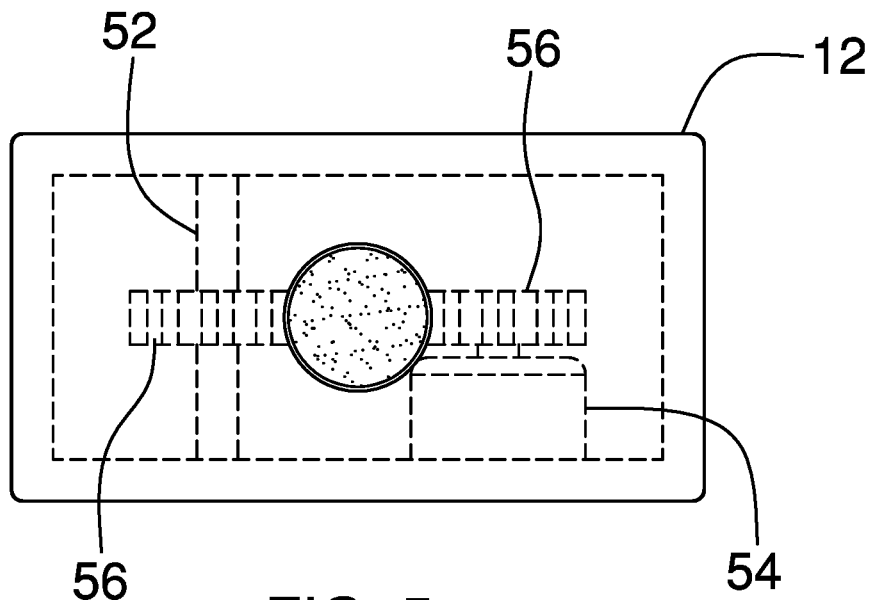
FIG. 5 is a bottom phantom view of an embodiment of the disclosure.

With reference now to the drawings, and in particular to FIGS. 1 through 8 thereof, a new wiper cleaning device embodying the principles and concepts of an embodiment of the disclosure and generally designated by the reference numeral 10 will be described.

As best illustrated in FIGS. 1 through 8, the windshield wiper cleaning assembly 10 generally comprises a housing 12 that is attachable to a windshield wiper arm 14 on a vehicle 16. The vehicle 16 may be a passenger vehicle, a cargo vehicle or any other motorized vehicle that is driven on public roads. The housing 12 has a top wall 18 and a bottom wall 20 and the top wall 18 is positionable against a bottom side 22 of the windshield wiper arm 14. The bottom wall 20 is directed toward a windshield 29 of the vehicle 16 and the bottom wall 20 has an opening 24 extending into an interior of the housing 12. A strap 26 is coupled to the housing 12 and the strap 26 is attachable around the windshield wiper arm 14 for retaining the housing 12 on the windshield wiper arm 14. The housing 12 may be a unitary structure of the windshield wiper arm 14.

A plunger unit 28 is movably integrated into the housing 12 and the plunger unit 28 is urged outwardly from the housing 12 when the plunger unit 28 is turned on. The plunger unit 28 abuts the windshield 29 of the vehicle 16 when the plunger unit 28 is turned on. In this way the arm 14 of the windshield 29 wiper can be urged away from the windshield 29. The plunger unit 28 is biased to retract into the housing 12 after the plunger unit 28 is turned on thereby facilitating a wiper blade 32 on the windshield wiper arm 14 to strike the windshield 29. In this way the plunger unit 28 can dislodge debris from the wiper blade 32.

The plunger unit 28 comprises a plunger 34 that has a first end 36, a second end 38 and an outer surface 40 extending therebetween. A pad 41 is coupled to the first end 36 and the pad 41 is comprised of a resiliently compressible material to inhibit the windshield 29 from being damaged by the plunger 34. The outer surface 40 has a plurality of indentations 42 extending inwardly therein and the indentations 42 are spaced apart from each other and are distributed between the first end 36 and the second end 38. Additionally, the plurality of indentations 42 includes a set of first indentations 44 and a set of second indentations 48. The set of first indentations 44 are positioned on the opposite side of the outer surface 40 with respect to the set of second indentations 48. The plunger 34 extends outwardly from the opening 24 in the bottom wall 20 of the housing 12 has the first end 36 of the plunger 34 is exposed. A biasing member 50 is coupled between the second end 38 of the plunger 34 and the top wall 18 of the housing 12. The biasing member 50 biases the plunger 34 to retract into the housing 12.

The plunger unit 28 includes a control circuit 52 is positioned in the housing 12 and the control circuit 52 receives an actuate input. The plunger unit 28 includes a motor 54 that is positioned within the housing 12 and the motor 54 is electrically coupled to the control circuit 52. The motor 54 rotates in a first direction when the control circuit 52 receives the actuate input. Moreover, the motor 54 rotates a pre-determined number of revolutions each time the control circuit 52 receives the actuate input. The motor 54 may comprise an electric motor or the like.

The plunger unit 28 includes a pair of gears 56 and each of the gears 56 is rotatably positioned within the housing 12. Each of the gears 56 has an outer surface 58 and the outer surface 58 of each of the gears 56 has a toothed portion 60 and a smooth portion 62. The toothed portion 60 of each of the gears 56 engages a respective one of the set of first indentations 44 and the set of second indentations 48 on the outer surface 40 of the plunger 34. The pair of gears 56 includes a drive gear 64 that is rotatably coupled to the motor 54 and a slave gear 66 that is rotationally independent from the motor 54. The toothed portion 60 of each of the drive gear 64 and the slave gear 66 engages the respective set of first indentations 44 and the set of second indentations 48 when the motor 54 is turned off. The motor 54 rotates the drive gear 64 when the motor 54 is turned on thereby urging the plunger 34 outwardly from the housing 12. Continuing, the plunger 34 is biased to retract into the housing 12 when the smooth portion 62 of each of the drive gear 64 and the slave gear 66 is rotated into alignment with the respective set of first indentations 44 and the set of second indentations 48.

The plunger unit 28 includes a receiver 68 that is positioned in the housing 12. The receiver 68 is electrically coupled to the control circuit 52. The receiver 68 may comprise a radio frequency receiver or the like. The plunger unit 28 includes a plunger power supply 70 that is positioned in the housing 12. The plunger power supply 70 is electrically coupled to the control circuit 52 and the plunger power supply 70 comprises at least one battery.

A remote control 72 is provided and the remote control 72 is in remote communication with the plunger unit 28. The remote control 72 turns the plunger unit 28 on when the remote control 72 is actuated to facilitate a user to remotely actuate the plunger unit 28. The remote control 72 includes a transmitter 74 and an actuate button 74. The transmitter 74 is in wireless communication with the receiver 68 and the transmitter 74 broadcasts an actuate command to the receiver 68 when the actuate button 74 is depressed. Moreover, the control circuit 52 receives the actuate input when the receiver 68 receives the actuate command from the transmitter 74. The transmitter 74 may comprise a radio frequency transmitter or the like.

In use, the actuate button 74 is depressed on the remote control 72 when debris, such as ice or snow, has accumulated on the wiper blade 32. Thus, the plunger 34 extends outwardly from the housing 12, engages the windshield 29, and lifts the wiper blade 32 away from the windshield 29. The plunger 34 is rapidly retracted into the housing 12 when the plunger 34 has been fully extended. In this way the wiper blade 32 is facilitated to strike the windshield 29 to dislodge the debris. The actuate button 74 can be depressed as many times as is necessary to fully dislodge the debris from the wiper blade 32.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A windshield wiper cleaning assembly for striking a windshield wiper against a windshield to dislodge debris from the windshield wiper, said assembly comprising:

a housing being attachable to an windshield wiper arm on a vehicle;

a plunger unit being movably integrated into said housing, said plunger unit being urged outwardly from said housing when said plunger unit is turned on, said plunger unit abutting the windshield when said plunger unit is turned on thereby facilitating the arm of the windshield wiper to be urged away from the windshield, said plunger being biased to retract into said housing after said plunger unit is turned on thereby facilitating a wiper blade on the windshield wiper arm to strike the windshield wherein said plunger unit is configured to dislodge debris from the wiper blade; and a remote control being in remote communication with said plunger unit, said remote control turning said plunger unit on when said remote control is actuated wherein said remote control is configured to facilitate a user to remotely actuate said plunger unit;

wherein said housing has a top wall and a bottom wall, said top wall being positionable against a bottom side of the windshield wiper arm having said bottom wall being directed toward a windshield of the vehicle, said bottom wall having an opening extending into an interior of said housing;

wherein said plunger unit comprises a plunger having a first end, a second end and an outer surface extending therebetween, said outer surface having a plurality of indentations extending inwardly therein, said plurality of indentations being spaced apart from each other and being distributed between said first end and said second end; and a biasing member being coupled between said second end of said plunger and said top wall of said housing, said biasing member biasing said plunger to retract into said housing.

2. The assembly according to claim 1, further comprising a strap being coupled to said housing, said strap being attachable around the windshield wiper arm for retaining said housing on the windshield wiper arm.

3. The assembly according to claim 1, wherein said plurality of indentations includes a set of first indentations and a set of second indentations, said set of first indentations being positioned on the opposite side of said outer surface with respect to said set of second indentations, said plunger extending outwardly from said opening in said bottom wall of said housing having said first end of said plunger being exposed.

4. The assembly according to claim 1, wherein said plunger unit includes a control circuit being positioned in said housing, said control circuit receiving an actuate input.

5. The assembly according to claim 4, wherein said plunger unit includes a motor being positioned within said housing, said motor being electrically coupled to said control circuit, said motor rotating in a first direction when said control circuit receives said actuate input, said motor rotating a pre-determined number of revolutions each time said control circuit receives said actuate input.

6. The assembly according to claim 4, further comprising a receiver being positioned in said housing, said receiver being electrically coupled to said control circuit.

7. The assembly according to claim 6, wherein said remote control includes a transmitter and an actuate button, said transmitter being in wireless communication with said receiver, said transmitter broadcasting an actuate command to said receiver when said actuate button is depressed, said control circuit receiving said actuate input when said receiver receives said actuate command from said transmitter.

8. The assembly according to claim 4, further comprising a plunger power supply being positioned in said housing, said plunger power supply being electrically coupled to said control circuit, said plunger power supply comprising at least one battery.

9. A windshield wiper cleaning assembly for striking a windshield wiper against a windshield to dislodge debris from the windshield wiper, said assembly comprising:

a housing being attachable to an windshield wiper arm on a vehicle;

a plunger unit being movably integrated into said housing, said plunger unit being urged outwardly from said housing when said plunger unit is turned on, said plunger unit abutting the windshield when said plunger unit is turned on thereby facilitating the arm of the windshield wiper to be urged away from the windshield, said plunger being biased to retract into said housing after said plunger unit is turned on thereby facilitating a wiper blade on the windshield wiper arm to strike the windshield wherein said plunger unit is configured to dislodge debris from the wiper blade;

a remote control being in remote communication with said plunger unit, said remote control turning said plunger unit on when said remote control is actuated wherein said remote control is configured to facilitate a user to remotely actuate said plunger unit;

wherein said plunger unit includes a control circuit being positioned in said housing, said control circuit receiving an actuate input;

wherein said plunger unit includes a motor being positioned within said housing, said motor being electrically coupled to said control circuit, said motor rotating in a first direction when said control circuit receives said actuate input, said motor rotating a pre-determined number of revolutions each time said control circuit receives said actuate input; and wherein said plunger unit includes:

a plunger having a plurality of indentations extending inwardly therein, said plurality of indentations includes a set of first indentations and a set of second indentations, said set of first indentations being positioned on the opposite side of said outer surface with respect to said set of second indentations; and a pair of gears, each of said gears being rotatably positioned within said housing, each of said gears having an outer surface, said outer surface of each of said gears having a toothed portion and a smooth portion, said toothed portion of each of said gears engaging a respective one of said set of first indentations and said set of second indentations on said outer surface of said plunger.

10. The assembly according to claim 9, wherein said pair of gears includes a drive gear being rotatably coupled to said motor and a slave gear being rotationally independent from said motor, said toothed portion of each of said drive gear and said slave gear engaging said respective set of first indentations and said set of second indentations when said motor is turned off, said motor rotating said drive gear when said motor is turned on thereby urging said plunger outwardly from said housing.

11. The assembly according to claim 10, wherein said plunger is biased to retract into said housing when said smooth portion of each of said drive gear and said slave gear is rotated into alignment with said respective set of first indentations and said set of second indentations.

12. A windshield wiper cleaning assembly for striking a windshield wiper against a windshield to dislodge debris from the windshield wiper, said assembly comprising:

a housing being attachable to an windshield wiper arm on a vehicle, said housing having a top wall and a bottom wall, said top wall being positionable against a bottom side of the windshield wiper arm having said bottom wall being directed toward a windshield of the vehicle, said bottom wall having an opening extending into an interior of said housing;

a strap being coupled to said housing, said strap being attachable around the windshield wiper arm for retaining said housing on the windshield wiper arm;

a plunger unit being movably integrated into said housing, said plunger unit being urged outwardly from said housing when said plunger unit is turned on, said plunger unit abutting the windshield when said plunger unit is turned on thereby facilitating the arm of the windshield wiper to be urged away from the windshield, said plunger being biased to retract into said housing after said plunger unit is turned on thereby facilitating a wiper blade on the windshield wiper arm to strike the windshield wherein said plunger unit is configured to dislodge debris from the wiper blade, said plunger unit comprising:

a plunger having a first end, a second end and an outer surface extending therebetween, said outer surface having a plurality of indentations extending inwardly therein, said plurality of indentations being spaced apart from each other and being distributed between said first end and said second end, said plurality of indentations including a set of first indentations and a set of second indentations, said set of first indentations being positioned on the opposite side of said outer surface with respect to said set of second indentations, said plunger extending outwardly from said opening in said bottom wall of said housing having said first end of said plunger being exposed;

a biasing member being coupled between said second end of said plunger and said top wall of said housing, said biasing member biasing said plunger to retract into said housing;

a control circuit being positioned in said housing, said control circuit receiving an actuate input;

a motor being positioned within said housing, said motor being electrically coupled to said control circuit, said motor rotating in a first direction when said control circuit receives said actuate input, said motor rotating a pre-determined number of revolutions each time said control circuit receives said actuate input;

a pair of gears, each of said gears being rotatably positioned within said housing, each of said gears having an outer surface, said outer surface of each of said gears having a toothed portion and a smooth portion, said toothed portion of each of said gears engaging a respective one of said set of first indentations and said set of second indentations on said outer surface of said plunger, said pair of gears including a drive gear being rotatably coupled to said motor and a slave gear being rotationally independent from said motor, said toothed portion of each of said drive gear and said slave gear engaging said respective set of first indentations and said set of second indentations when said motor is turned off, said motor rotating said drive gear when said motor is turned on thereby urging said plunger outwardly from said housing, said plunger being biased to retract into said housing when said smooth portion of each of said drive gear and said slave gear is rotated into alignment with said respective set of first indentations and said set of second indentations;

a receiver being positioned in said housing, said receiver being electrically coupled to said control circuit; and a plunger power supply being positioned in said housing, said plunger power supply being electrically coupled to said control circuit, said plunger power supply comprising at least one battery; and a remote control being in remote communication with said plunger unit, said remote control turning said plunger unit on when said remote control is actuated wherein said remote control is configured to facilitate a user to remotely actuate said plunger unit, said remote control including a transmitter and an actuate button, said transmitter being in wireless communication with said receiver, said transmitter broadcasting an actuate command to said receiver when said actuate button is depressed, said control circuit receiving said actuate input when said receiver receives said actuate command from said transmitter.

\* \* \* \* \*